3,211,735
N-ARYL-N'-OXYALKYLDIAZACYCLOALKANES
George de Stevens, Summit, and Robert Paul Mull, Florham Park, N.J., assignors to Ciba Corporation, New York, N.Y., a corporation of Delaware
No Drawing. Filed Nov. 4, 1963, Ser. No. 321,330
11 Claims. (Cl. 260—268)

This is a continuation-in-part of application Serial No. 251,022 filed January 14, 1963, now abandoned.

The present invention relates to basic aryl ethers, especially to N-monocyclic aryl-N'-(3-monocyclic carbocyclic aryl-X-2-Y-propyl)-diaza-cycloalkanes, in which X is oxygen or sulfur, and Y is hydroxyl, lower alkoxy or acyloxy, and in which the diaza-cycloalkane portion has from six to eight ring members, and its two nitrogen atoms are separated from one another by two to three carbon atoms. More particularly, it relates to compounds having the formula

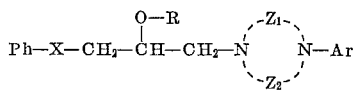

in which the group Ph represents monocyclic carbocyclic aryl, X is oxygen or sulfur, R stands for hydrogen, lower alkyl or acyl, each of the groups $Z_1$ and $Z_2$ stands for alkylene having from two to seven carbon atoms and separating the two nitrogen atoms by two to three carbon atoms, and Ar stands for monocyclic aryl, salts, N-oxides, salts of N-oxides or quaternary ammonium compounds thereof, as well as process for the preparation of these compounds.

A monocyclic aryl group, representing Ar in the above formula stands primarily for a monocyclic carbocyclic aryl radical, i.e. phenyl or substituted phenyl having one or more than one of the same or of different substituents attached to any of the positions available for substitution; substituents are, for example, lower alkyl, e.g. methyl, ethyl, n-propyl, isopropyl, n-butyl, isobutyl, tertiary butyl and the like, etherified hydroxyl, particularly lower alkoxy, e.g. methoxy, ethoxy, n-propyloxy, isopropyloxy, n-butyloxy and the like, esterified hydroxyl, particularly halogeno (representing hydroxyl esterified with a hydrohalic acid), e.g. fluoro, chloro, bromo and the like, trifluoromethyl, or any other suitable substituent. A monocyclic carbocyclic aryl group Ar is especially phenyl or substituted phenyl, such as (lower alkyl)-phenyl, (etherified hydroxy)-phenyl, particularly (lower alkoxy)-phenyl, (esterified hydroxy)-phenyl, particularly (halogeno)-phenyl, (trifluoromethyl)-phenyl, or any other equivalent substituted phenyl radical. A monocyclic aryl group representing Ar in the above formula, also stands for a monocyclic heterocyclic aryl radical, especially monocyclic azacyclic aryl, particularly pyridyl, e.g. 2-pyridyl, 3-pyridyl or 4-pyridyl, as well as substituted pyridyl, such as (lower alkyl)-pyridyl. Other monocyclic heterocyclic aryl radicals are, for example, monocyclic oxacyclic aryl, such as furyl, e.g. 2-furyl and the like, or monocyclic thiacyclic aryl, such as thienyl, e.g. 2-thienyl and the like.

The monocyclic carbocyclic aryl radical, i.e. the group Ph in the above formula represents phenyl or substituted phenyl having one or more than one of the same or of different substituents attached to any of the positions available for substitution in the phenyl nucleus; substituents are those mentioned above and represent, for example, lower alkyl, etherified hydroxyl, particularly lower alkoxy, esterified hydroxyl, particularly halogeno, trifluoromethyl, or any other suitable substituent. The monocyclic carbocyclic aryl group Ph represents, for example, phenyl, (lower alkyl)-phenyl, (etherified hydroxy)-phenyl, particularly (lower alkoxy)-phenyl, (esterified hydroxy)-phenol, particularly (halogeno)-phenyl, (trifluoromethyl)-phenyl, or any other equivalent substituted phenyl radical.

The group X is above all oxygen, but may also stand for sulfur.

The group Y is particularly hydroxyl (i.e. R in the above formula represents hydrogen), but may also be lower alkoxy (i.e. R in the above formula may also be lower alkyl), e.g. methoxy, ethoxy, n-propyloxy, isopropyloxy, n-butyloxy, isobutyloxy, secondary butyloxy, tertiary butyloxy, n-pentyloxy, isopentyloxy, n-hexyloxy, n-heptyloxy and the like (i.e. R in the above formula may stand for methyl, ethyl, n-propyl, isopropyl, n-butyl, isobutyl, secondary butyl, tertiary butyl, n-pentyl, isopentyl, n-hexyl, n-heptyl and the like). The group Y may also be acyloxy (i.e. R in the above formula may be also an acyl group), in which acyl is the acyl radical of an organic carboxylic acid, particularly a lower alkanoic acid; Y is, therefore, also organic carbonyloxy, particularly lower alkanoyloxy, e.g. acetyloxy, propionyloxy, pivaloyloxy and the like (i.e. R in the above formula may stand for lower alkanoyl, e.g. acetyl, propionyl, pivalyl and the like).

Each of the groups $Z_1$ and $Z_2$ in the above formula represents alkylene having from two to seven, preferably from two to three, carbon atoms, and separating the two nitrogen atoms by from two to three carbon atoms. These alkylene radicals are above all 1,2-ethylene, as well as 1,2-propylene or 1,3-propylene, but may also stand for 1,2-butylene, 2,3-butylene, 1,2-isobutylene, 1,2-pentylene, 2,3-pentylene, 1,2-isopentylene, 1,2-hexylene, 3,4-hexylene, 3-methyl-1,2-isopentylene, 1,2-heptylene and the like.

Salts of the compounds of this invention are acid addition salts, for example, pharmaceutically acceptable, nontoxic addition salts with suitable acids, such as inorganic acids e.g. hydrochloric, hydrobromic, nitric, sulfuric, phosphoric acids or organic acids, such as organic carboxylic acids, e.g. acetic, propionic, glycolic, malonic, succinic, maleic, hydroxy-maleic, fumaric, malic, tartaric, citric, benzoic, salicylic, 4-aminosalicylic, 2-acetoxybenzoic, nicotinic, isonicotinic acid and the like or organic sulfonic acids, e.g. methane sulfonic, ethane sulfonic, 2-hydroxy-ethane sulfonic, ethane 1,2-disulfonic, benzene sulfonic, toluene sulfonic, naphthalene 2-sulfonic acid and the like. Other acid addition salts may serve, for example, as intermediates for the preparation of other salts, or in the purification of the free compound, as well as for identification and characterization. Acid addition salts primarily used for the latter purposes are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like.

The compounds of this invention may also be in the form of N-oxides thereof, or the acid addition salts, such as the pharmaceutically acceptable, non-toxic acid addition salts, or such N-oxides, particularly the salts thereof with the above inorganic or organic acids.

Quaternary ammonium derivates of the compounds of this invention are those with reactive esters formed by alcohols and strong acids, particularly those with lower alkyl halides, e.g. methyl, ethyl, n-propyl, isopropyl, chloride, bromide or iodide and the like, phenyl-lower alkyl halides, e.g. benzyl chloride, benzyl bromide, 2-phenylethyl bromide and the like, di-lower alkyl sulfates, e.g. dimethyl sulfate, diethyl sulfate and the like, lower alkyl lower alkane sulfonates, e.g. methyl or ethyl methane or ethane sulfonate and the like, or lower alkyl monocyclic carbocyclic aryl sulfonates, e.g. methyl p-toluene sulfonate and the like. Also included as quaternary ammonium compounds are the quaternary ammonium hydroxides, and other quaternary ammonium salts having an anion other than a halogeno, sulfate or sulfonate ion.

The compounds of this invention have anti-inflammatory, antihypertensive and adrenolytic properties and are used accordingly.

Compounds having anti-inflammatory properties, as demonstrated in the granuloma pouch test (Selye, Proc. Soc. Exp. Biol. and Med., vol. 82, p. 328 (1953), as modified by Robert et al. Acta Endrocrinologica, vol. 25, p. 105 (1957)), the cotton pellet implant test (Meier et al., Experientia, vol. 6, p. 469 (1950)), or the pleural cavity inflammation test (Holtcamp, Fed. Proc., vol. 17, p. 379 (1958)), are useful as anti-inflammatory agents in place of corticoid steroids, e.g. cortisone, hydrocortisone and the like, for example, in the treatment of tissue inflammations, such as arthritic inflammations and the like.

Compounds having antihypertensive properties are useful as hypotensive agents to lower the blood pressure in hypertensive conditions.

Compounds having adrenolytic effects are useful as vasodilators in peripheral vascular diseases, e.g. Reynaud's disease, causalgia and the like, or to counteract the pronounced effects on the tissue, of pressor substances such as norepinephrine and the like. They are also useful as diagnostic tools to determine the proper functioning of the adrenal glands, due to their capability of suppressing the release of pressure substances, e.g. epinephrine and the like, from normal functioning glands.

Especially useful are the compounds of the formula

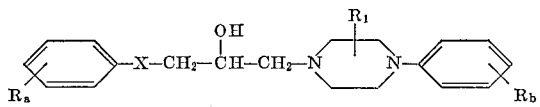

in which X is primarily oxygen, as well as sulfur, the radical $R_1$ is hydrogen or methyl, and each of the groups $R_a$ and $R_b$ stands for hydrogen, lower alkyl, lower alkoxy, halogeno, or trifluoromethyl, and the acid addition salts, particularly pharmaceutically acceptable, non-toxic acid addition salts, thereof.

Particularly outstanding pharmacological properties are exhibited by the compounds of the formula

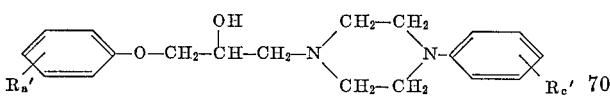

in which each of the groups $R_a'$ and $R_c'$ is hydrogen, lower alkyl, especially methyl, lower alkoxy, particularly methoxy, or halogeno, especially chloro, and acid addition salts, particularly pharmaceutically acceptable, non-toxic acid addition salts, thereof.

The new compounds of this invention are useful in the form of compositions for enteral, e.g. oral, or parenteral administration, which contain the new compounds in admixture with a pharmaceutically acceptable, organic or inorganic, solid or liquid carrier. For making up these preparations there are employed known carrier substances such as water, gelatin, lactose, glucose, starches, stearic acid, magnesium stearate, calcium stearate, stearyl alcohol, talc,tragacanth, acacia, vegetable oils, benzyl alcohols, gums, propylene glycol, polyalkylene glycols or any other suitable materials used in pharmaceutical preparations. The latter are in the solid form, e.g. capsules, tablets, dragees, suppositories and the like, or on liquid form, e.g. solution, suspensions, emulsions and the like. If necessary, they contain auxiliary substances, such as preserving, stabilizing, wetting, emulsifying, coloring, flavoring agents and the like, salts for varying the osmotic pressure, buffers, etc. They are prepared according to standard method and contain, in combination, other useful substances.

The compounds of this invention are prepared according to known methods, for example, by reacting an N-monocyclic aryldiaza-cycloalkane, in which the diazacycloalkane portion has from six to eight ring members, and its two nitrogen atoms are separated from one another by two to three carbon atoms, especially a compound of the formula

in which Ar, $Z_1$ and $Z_2$ have the previously-given meaning, with a 3-monocyclic carbocyclic aryl-X-1,2-oxidopropane, in which X has the previously given-meaning, particularly with a compound of the formula

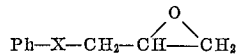

in which Ph and X have the previously-given meaning, and if desired, converting in a resulting compound the free hydroxyl group into a lower alkoxy group or an acyloxy group, and/or, if desired, converting in a resulting compound an acyloxy group into the free hydroxyl group, and/or, if desired, converting a resulting salt into the free compound or into another salt, and/or, if desired, converting a resulting compound into an N-oxide or a quaternary ammonium compound, and/or, if desired, converting a resulting compound or an N-oxide into a salt thereof, and/or, if desired, converting a quaternary ammonium compound into another quaternary ammonium compound, and/or, if desired, separating a resulting mixture of isomers into the single isomers.

The above reaction is carried out, for example, by mixing the two reagents, either in the absence or in the presence of a diluent. It is performed while cooling, at room temperature, or at an elevated temperature, if necessary, in a closed vessel, and/or in the atmosphere of an inert gas, e.g. nitrogen.

The starting materials used in the above reaction are known or are prepared according to the methods used for the known ones.

The compounds of this invention are also prepared by reacting an N-monocyclic aryl-diaza-cycloalkane, in which the diaza-cycloalkane portion has from six to eight ring members, and its two nitrogen atoms are separated from one another by two to three carbon atoms, especially a compound of the formula

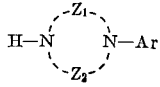

in which Ar, $Z_1$ and $Z_2$ have the previously-given meaning, or a salt thereof, with a reactive ester of a 3-monocyclic carbocyclic aryl-X-2-Y-propanol, in which X and Y have the previously-given meaning, particularly with a compound of the formula

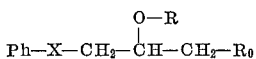

in which Ph, X and R have the previously-given meaning, and $R_0$ is a reactive esterified hydroxy group, and, if desired, carrying out the optional steps.

A salt of an N-monocyclic aryl-diaza-cycloalkane starting material is above all a metal compound, such as an alkali metal, e.g. lithium, sodium, potassium and the like, compound thereof. Such compound is prepared according to known methods; for example, a solution of the diaza-cycloalkane compound in a suitable solvent (the selection of which depends on the solubility of the starting material and/or the reactivity of the salt-forming reagent) or solvent mixture, is treated with an alkali metal, e.g. sodium and the like, with an alkali metal hydride or amide, e.g. lithium, sodium or potassium hydride or amide and the like, with an alkali metal carbonate, e.g. sodium carbonate, potassium carbonate and the like, or any other suitable salt-forming reagent, such as, for example, an alkali metal lower alkoxide and the like, if necessary, while cooling or heating, and/or in the atmosphere of an inert gas, e.g. nitrogen. A metal salt-forming reagent may also be added to the mixture of the two starting materials, preferably a solution thereof, thus forming the salt in situ and bringing about the desired reaction. Other salts of the N-monocyclic aryl-diaza-cycloalkane starting material are acid addition salts, such as those with the previously described acids.

A reactive ester of a 3-monocyclic carbocyclic aryl-X-2-Y-propanol is primarily an ester thereof with a strong inorganic acid, particularly a hydrohalic acid, e.g. hydrochloric, hydrobromic acid and the like, as well as sulfuric acid, or any other equivalent inorganic acid, or a strong organic sulfonic acid, e.g. methane sulfonic, p-toluene sulfonic acid and the like. $R_0$ in the above formula is, therefore, primarily halogeno, particularly chloro or bromo, as well as a reactive organic sulfonyloxy group, e.g. methylsulfonyloxy, 4-methyl-phenyl-sulfonyloxy and the like. Preferred starting materials of the above type are the 3-monocyclic carbocyclic aryl-X-2-Y-propyl halides, in which the halide is especially chloro, as well as bromo.

The reaction is carried out according to known methods. Thus, whenever the free N-monocyclic aryl-diaza-cycloalkane is used, the generated acid may be neutralized by adding an excess of the N-monocyclic aryl-diaza-cycloalkane, or another base, e.g. sodium acetate, potassium carbonate and the like. An acid addition salt of the starting material is reacted with the reactive ester of a 3-monocyclic carbocyclic aryl-X-2-Y-propanol in the presence of an excess of the salt-forming reagent. Preferably, the reaction is performed in the presence of a diluent (such as, for example, one of those used for the preparation of the metal compound), if necessary, while cooling or heating, in the atmosphere of an inert gas, e.g. nitrogen, and/or, in a closed vessel.

The starting materials used in the above reaction are known or may be prepared according to known methods. Thus, the previously described 3-monocyclic carbocyclic aryl-X-1,2-oxidopropanes, in which X has the previously-given meaning, may be converted into the desired starting materials used in the above procedure by reaction with a suitable inorganic acid or organic sulfonic acid, capable of forming a reactive esterified hydroxyl group, and, if desired, a free hydroxyl group may be converted into a lower alkoxy or an acyloxy group.

The compounds of this invention are also prepared by reacting an N-(3-monocyclic carbocyclic aryl-X-2-Y-propyl)-amine, in which X and Y have the previously-given meaning, particularly a compound of the formula

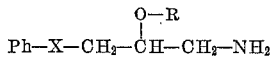

in which Ph, X and R have the previously given meaning, or a salt thereof with an N-monocyclic aryl-N,N-bis-(reactive esterified hydroxy-alkyl)-amine, in which nitrogen is separated from the reactive esterified hydroxyl groups by two to three carbon atoms, particularly a compound of the formula:

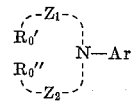

in which Ar, $Z_1$ and $Z_2$ have the previously given meaning, and each of the groups $R_0'$ and $R_0''$ stands for an esterified hydroxyl group, or a salt thereof, and, if desired, carrying out the optional steps.

In the above starting material, the reactive esterified hydroxyl groups $R_0'$ and $R_0''$ have the same meaning as $R_0$ and represent primarily halogeno, having preferably an atomic weight between 35 and 80, both inclusive, e.g. chloro or bromo, as well as organic sulfonyloxy. The reaction is carried out according to known methods, if necessary, at an increased temperature, in a closed vessel, in the atmosphere of an inert gas, e.g. nitrogen, and/or in the presence of an acid neutralizing base.

The starting materials used in the above procedure are known or are prepared according to known methods. For example, a reactive ester of a 3-monocyclic carbocyclic-aryl-X-2-Y-propanol, when reacted with ammonia, or an equivalent reagent, such as an N-alkali metal-phthalimide and then hydrazine, can be converted into the desired N-(3-monocyclic carbocyclic aryl-X-2-Y-propyl)-amine.

A further process for the preparation of the compounds of this invention comprises reacting an N-(3-monocyclic carboxylic aryl-X-2-Y-propyl)-N,N-di-(reactive esterified hydroxy-alkyl)-amine, in which X and Y have the previously-given meaning, and nitrogen is separated from the reactive esterified hydroxyl groups by two to three carbon atoms, particularly a compound of the formula:

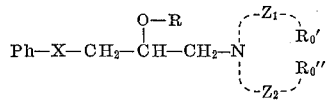

in which Ph, X, R, $Z_1$, $Z_2$, $R_0'$ and $R_0''$ have the previously-given meaning, or a salt thereof, with an N-monocyclic aryl-amine, particularly a compound of the formula $Ar-NH_2$, in which Ar has the previously-given meaning and, or a salt thereof, if desired, carrying out the optional steps.

The above reaction is carried out according to known methods, such as those mentioned hereinbefore. The N,N-(3-monocyclic carbocyclic aryl-X-2-Y-propyl)-N,N-bis-(reactive esterified hydroxy-alkyl)-amine starting material may be obtained for example, by treating a reactive ester of a 3-monocyclic carbocyclic aryl-X-2-Y'-propanol, in which Y' is lower alkoxy or acyloxy, with an N,N-di-(hydroxy-alkyl)-amine, in which nitrogen is separated from the hydroxyl groups by two to three carbon atoms, converting in a resulting N,N-di-(hydroxy-alkyl)-N-(3-monocyclic carbocyclic aryl-X-2-Y'-propyl) amine, in which nitrogen is separated from the hydroxyl groups by two to three carbon atoms, the free hydroxyl groups into reactive esterified hydroxyl groups, such as halogeno, e.g. chloro and the like (for example, by treatment with a thionyl halide, e.g. thionyl chloride and the like, or a phosphorus halide, e.g. phosphorus tribromide and the like), or into organic sulfonyloxy groups, e.g. methylsulfonyloxy, 4-methyl-phenyl-sulfonyloxy and the like (for example, by treatment with an organic sulfonic acid halide, e.g. methane sulfonic acid chloride, p-toluene sulfonyl chloride and the like), and if desired, converting an acyloxy group representing Y' into the free hydroxyl group.

The compounds of the present invention are also prepared by reacting an N-monocyclic aryl-N'-(3-monocyclic carbocyclic aryl-X-2-Y-propyl)-alkylene diamine, in which X and Y have the previously given meaning, and the two nitrogens are separated by two to three carbon atoms, especially a compound of the formula

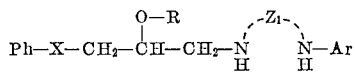

in which Ph, Ar, X, R and $Z_1$ have the previously given meaning, or a salt thereof with a reactive diester of an alkylenediol, in which the two hydroxyl groups are separated by two to three carbon atoms, particularly a compound of the formula $R_0'$—$Z_2$—$R_0''$, in which $Z_2$, $R_0'$ and $R_0''$ have the previously given meaning, and, if desired, carrying out the optional steps.

The above reaction is performed according to the previously described procedures, preferably in the presence of an acid-neutralizing reagent, which may also be furnished by an excess of the N-monocyclic aryl-N'-(3-monocyclic carbocyclic aryl-X-2-Y-propyl)-alkylene diamine starting material. The latter may be prepared by treating an excess of an N-monocyclic aryl-alkylene-diamine with a mole of a reactive ester of a 3-monocyclic carbocyclic aryl-X-2-Y-propanol, and is preferably reacted with a reactive diester of an alkylenediol (which is preferably an alkylene halide, in which the two halogens are primarily chloro or bromo, and are separated by two, as well as three carbon atoms), with which it forms a six-membered diazacycloalkane ring.

The compounds of this invention may also be prepared, for example, by converting in an N-monocyclic aryl-N'-3 - monocyclic carbocyclic aryl-X-2-Y-propionyl)-diaza-cycloalkane or in an N-monocyclic aryl-N'-(3-monocyclic carbocyclic aryl-X-2-Y-thiopropionyl)-diaza-cycloalkane, in which X and Y have the previously given meaning, and in which the diaza-cycloalkane portion has from six to eight ring members, and its two nitrogen atoms are separated from one another by two to three carbon atoms, particularly in a compound of the formula

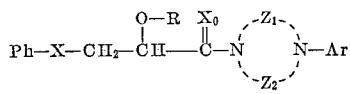

in which Ph, X, R, $Z_1$, $Z_2$ and Ar have the previously given meaning, and $X_0$ has the same meaning as X, i.e. is oxygen or sulfur, the carbonyl group or the thiocarbonyl group into a methylene group, i.e. the group $X_0$ into two hydrogen atoms, and, if desired, carrying out the optional steps.

The above conversion of the carbonyl group into methylene is carried out according to known methods, for example, by treatment with a suitable aluminum hydride reducing reagent, e.g. lithium aluminum hydride and the like, in the presence of a solvent, e.g. diethyl ether, tetrahydrofuran and the like, or by any other suitable method, such as hydrogen in the presence of certain catalysts, for example, a copper-chromium catalyst and the like, or by electrolytic reduction. A thiocarbonyl group is converted into methylene, for example by treatment with a suitable desulfurizing reagent, e.g. Raney nickel and the like.

The starting materials used in the above reaction may be prepared according to known methods, for example, by reacting and N-monocyclic aryl-diaza-cycloalkane with a 3-monocyclic carbocyclic aryl-X-2-Y-propionic acid halide, e.g. chloride and the like, and, if desired, converting in a resulting N-monocyclic aryl-N'-(3-monocyclic carbocyclic aryl-X-2-Y-propionyl)-diaza-cycloalkane, the carbonyl group into a thiocarbonyl group, for example, by treatment with phosphorus pentasulfide and the like.

In a resulting compound, a free hydroxyl group may be converted into a lower alkoxy group according to known methods, for example, by reacting a metal compound, particularly an alkali metal, e.g. sodium, potassium and the like, compound (prepared according to the previously-described procedure) with a lower alkyl halide, by converting in a resulting compound the free hydroxyl group into a reactive organic sulfonyloxy group, and treating the resulting ester with a lower alkanol, if necessary, in the presence of a suitable base, e.g. N,N,N-triethylamine and the like, by converting in a resulting compound the free hydroxyl group into halogeno (for example, according to one of the previously mentioned procedures) and reacting the halogeno-compound with an alkali metal lower alkoxide, or by reacting the resulting compound having a free hydroxyl group with a lower diazoalkane, preferably in the presence of a suitable Lewis acid, e.g. fluoboric acid, aluminum isopropanolate and the like.

The free hydroxyl group in a resulting compound may also be converted into an acyloxy group according to known methods for example, by treatment with a suitable acylating agent, such as an organic carboxylic halide or anhydride, if necessary, in the presence of a base, e.g. pyridine and the like.

Furthermore, in a resulting compound having an acyloxy group, such group may be converted into a free hydroxyl group, for example, by hydrolysis with a suitable basic reagent.

A resulting salt may be converted into the free compound according to known methods, for example, by treatment with a base, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia, or any other suitable reagent, or with a hydroxyl ion exchange preparation and the like.

A resulting salt may be converted into another salt according to known methods: for example, a salt with an inorganic acid may be treated with a suitable metal, e.g. sodium, barium, silver and the like, salt of an acid in the presence of an appropriate solvent, in which a resulting inorganic compound is insoluble and is thus removed from the reaction medium, or by treating a salt with an anion exchange preparation or any other suitable reagent.

A free base may be converted into its acid addition salt according to known methods, for example, by reacting it with an acid, such as one of the inorganic or organic acids mentioned before, for example, by treating a solution of the base in a suitable solvent or solvent mixture with the acid or a solution thereof, and isolating the desired salt. A salt may also be prepared by reacting a solution of the free base with a suitable anion exchange preparation. The salts may also be obtained in the form of hydrates thereof or may contain solvent of crystallization.

The compounds of the present invention form N-oxides, which may be prepared according to known methods, for example, by reacting a resulting compound, preferably a solution thereof in an inert solvent, with an N-oxidizing reagent, such as, for example, hydrogen peroxide, ozone, persulfuric acid, or an organic peracid, such as an organic percarboxylic acid, e.g. peracetic, perbenzoic, monoperphthalic acid and the like, or an organic persulfonic acid, e.g. p-toluene persulfonic acid and the like. A resulting N-oxide may be converted into an acid addition salt thereof according to the above method.

Quaternary ammonium derivatives of the compounds of this invention may be obtained, for example, by reacting the free compound with an ester formed by a hydroxylated compound and a strong inorganic or organic acid, such as one of those previously mentioned. The quaternizing reaction may be performed in the presence or absence of a suitable solvent, if necessary, while cooling or at an elevated temperature, in a closed vessel and/or in the atmosphere of an inert gas, e.g. nitrogen.

Resulting quaternary ammonium compounds may be converted into other quaternary ammonium compounds, such as the corresponding quaternary ammonium hydroxides, for example, by reacting a quaternary ammonium halide with silver oxide, or a quaternary ammonium sulfate with barium hydroxide, by treating a quaternary ammonium salt with an anion exchange preparation, by electrodialysis and the like. From a resulting quaternary ammonium hydroxide, there may be prepared a quaternary ammonium salt by reaction with an acid or with a lower alkyl sulfate, e.g. methyl sulfate, ethyl sulfate and the like. A quaternary ammonium salt may also be converted directly into another quaternary ammonium salt without the formation of an intermediary quaternary ammonium hydroxide; for example, a quaternary ammonium iodide may be reacted with freshly prepared silver chloride or with hydrogen chloride in anhydrous methanol to yield the quaternary ammonium chloride, or a quaternary ammonium salt may be treated with a suitable anion exchange preparation and converted into another quaternary ammonium salt. Quaternary ammonium compounds may be isolated in the form of hydrates or may contain solvent of crystallization.

A resulting mixture of isomers may be separated into single isomers. For example, racemates may be resolved into the optically active d- and l-forms according to known resolution procedures, for example, by reacting the free racemic compound, preferably in the presence of a suitable solvent, with one of the optically active forms of an acid having an asymmetric carbon atom or a solution thereof. Especially useful as optically active forms of salt-forming acids having an asymmetric carbon atom are D-tartaric (l-tartaric) and L-tartaric (d-tartaric) acid, as well as the optically active forms of malic, mandelic, camphor 10-sulfonic, quinic acid and the like. The resulting mixture of salts is separated into the single salts on the basis of physico-chemical differences, e.g. different solubilities and the like, and the free and optically active base may be liberated from the resulting salt according to the previously described procedure; an optically active base may be converted into another acid addition salt, an N-oxide, an acid addition salt of an N-oxide or a quaternary ammonium compound according to the above-described methods.

The invention also comprises any modification of the process wherein a compound obtainable as an intermediate at any stage of the process is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon.

*Example 1*

A mixture of 3.0 g. of 1,2-oxido-3-phenyloxy-propane and 3.5 g. of 1-(2-methyl-phenyl)-piperazine is allowed to stand over night at room temperature. The resulting viscous material is treated with 10 ml. of acetone, and the crystalline 1-(2-hydroxy-3-phenyloxy-propyl)-4-(2-methyl-phenyl)-piperazine of the formula

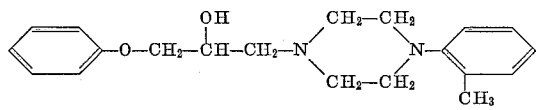

is collected, dissolved in ethanol and treated with a solution of hydrogen chloride in ethanol. The desired 1-(2-hydroxy-3-phenyloxy propyl)-4-(2-methyl-phenyl)-piperazine dihydrochloride is recrystallized from acetone, M.P. 170–171°.

*Example 2*

A mixture of 3.45 g. of 1,2-oxido-3-phenyloxy-propane and 4.6 g. of 1-(2-chloro-phenyl)-piperazine is allowed to stand overnight at room temperature; the solid material is treated with acetone, and the crystalline 4-(2-chloro-phenyl)-1-(2-hydroxy - 3 - phenyloxy-propyl)-piperazine of the formula

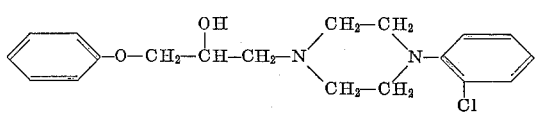

is converted into its dihydrochloride, M.P. 173–176° according to the procedure described in Example 1.

*Example 3*

The mixture of 3.45 g. of 1,2-oxido-3-phenyloxy-propane and 4.5 g. of 1-(3-chloro-phenyl)- piperazine is reacted as described in Example 1. The crystalline 4-(3-chloro-phenyl)-1-(2 - hydroxy-3-phenyloxy-propyl)-piperazine of the formula

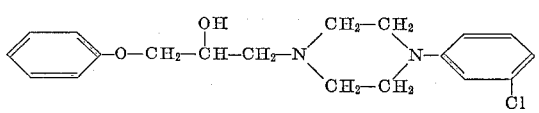

which melts at 85°, is converted into its dihydrochloride, M.P. 173°.

Upon treatment of 4-(3-chloro-phenyl)-1-(2-hydroxy-3-phenyloxy-propyl)-piperazine with diazoethane in the presence of aluminum isopropylate or with propionic acid anhydride in the presence of pyridine, the 4-(3-chloro-phenyl)-1-(2-ethyloxy-3-phenyloxy - propyl) - piperazine and the 4-(3-chloro-phenyl)-1-(3-phenyloxy-2-propionyl - oxy-propyl)-piperazine, respectively, are obtained.

*Example 4*

A mixture of 10.5 g. of 1-(2-methyl-phenyl)-piperazine and 9.0 g. of 1,2-oxido-3-phenyloxy-propane is allowed to stand at room temperature for three days. The resulting material is washed with acetone, the solid material is filtered off, dissolved in ethanol and treated with a saturated solution of hydrogen chloride in ethanol to yield the 1 - (2 - hydroxy - 3 - phenyloxy-propyl)-4-(2-methyl-phenyl)-piperazine monohydrochloride, which melts at 215–216° after recrystallization from ethanol.

Other compounds prepared according to the above procedure are, for example:

1 - (2 -hydroxy-3-phenyloxy-propyl)-4-(4-methyl-phenyl)-piperazine, which is prepared from 8.6 g. of 1-(4-methyl-phenyl)-piperazine and 8.6 g. of 1,2-oxido-3-phenyloxy-propane, and melts at 117° after recrystallization from ethanol;

1 - (2 -hydroxy-3-phenyloxy-propyl)-4-(3-methyl-phenyl)-piperazine, which is prepared from 2.0 g. of 1-(3-methyl-phenyl)-piperazine and 2.0 g. of 1,2-oxido-3-phenyloxy-propane, and the dihydrochloride of which melts at 179–180° after recrystallization from ethanol;

1-(2-hydroxy-3-phenyloxy-propyl)-4-(4-methoxy-phenyl)-piperazine, which is prepared from 9.0 g. of 1-(4-methoxy-phenyl)-piperazine and 8.6 g. of 1,2-oxido-3- phenyloxy-propane, and which melts at 92–93°, as well as the following compounds:

| N-monocyclic aryl-diaza-cycloalkane | 3-monocyclic carbo-cyclic aryl-X-1,2-oxido-propane | N-monocyclic aryl-N'-(2-hydroxy-3-monocyclic carbo-cyclic aryl-X-propyl)-diaza-cycloalkane |
|---|---|---|
| 1-(2-chloro-phenyl)-piperazine | 3-(4-chloro-phenyl)-oxy-1,2-oxido-propane | 1-[3-(4-chloro-phenyl)-oxy-2-hydroxy-propyl]-4-(2-chloro-phenyl)-piperazine. |
| 1-(2-methoxy-phenyl)-piperazine | 3-(4-chloro-phenyl)-oxy-1,2-oxido-propane | 1-[3-(4-chloro-phenyl)-oxy-2-hydroxy-propyl]-4-(2-methoxy-phenyl)-piperazine. |
| 1-(3,4-dimethoxy-phenyl)-piperazine | 3-(4-chloro-phenyl)-oxy-1,2-oxido-propane | 1-[3-(4-chloro-phenyl)-oxy-2-hydroxy-propyl]-4-(3,4-dimethoxy-phenyl)-piperazine. |
| 2-methyl-1-phenyl-piperazine | 3-(4-chloro-phenyl)-oxy-1,2-oxido-propane | 1-[3-(4-chloro-phenyl)-oxy-2-hydroxy-propyl]-3-methyl-4-phenyl-piperazine. |
| 1-(3-methyl-phenyl)-piperazine | 3-(4-chloro-phenyl)-oxy-1,2-oxido-propane | 1-[3-(4-chloro-phenyl)-oxy-2-hydroxy-propyl]-4-(3-methyl-phenyl)-piperazine. |
| 1-(4-bromo-phenyl)-piperazine | 3-(4-chloro-phenyl)-oxy-1,2-oxido-propane | 4-(4-bromo-phenyl)-1-[3-(4-chloro-phenyl)-oxy-2-hydroxy-propyl]-piperazine. |
| 1-(2-methoxy-phenyl)-piperazine | 3-(4-methyl-phenyl)-oxy-1,2-oxido-propane | 1-[2-hydroxy-3-(4-methyl-phenyl)-oxy-propyl]-4-(2-methoxy-phenyl)-piperazine. |
| 1-(2-methyl-phenyl)-piperazine | 3-(4-methyl-phenyl)-oxy-1,2-oxido-propane | 1-[2-hydroxy-3-(4-methyl-phenyl)-oxy-propyl]-4-(2-methyl-phenyl)-piperazine. |
| 1-(3-methyl-phenyl)-piperazine | 3-(4-methyl-phenyl)-oxy-1,2-oxido-propane | 1-[2-hydroxy-3-(4-methyl-phenyl)-oxy-propyl]-4-(3-methyl-phenyl)-piperazine. |
| 1-(4-chloro-phenyl)-piperazine | 3-(4-methyl-phenyl)-oxy-1,2-oxido-propane | 4-(4-chloro-phenyl)-1-[2-hydroxy-3-(4-methyl-phenyl)-oxy-propyl]-piperazine. |
| 1-(3,4-dichloro-phenyl)-piperazine | 3-(4-methyl-phenyl)-oxy-1,2-oxido-propane | 4-(3,4-dichloro-phenyl)-1-[2-hydroxy-3-(4-methyl-phenyl)-oxy-propyl]-piperazine. |
| 1-(2-methyl-phenyl)-piperazine | 3-(4-methoxy-phenyl)-oxy-1,2-oxido-propane | 1-[2-hydroxy-3-(4-methoxy-phenyl)-oxy-propyl]-4-(2-methyl-phenyl)-piperazine. |
| 1-(3-chloro-phenyl)-piperazine | 3-(4-methoxy-phenyl)-oxy-1,2-oxido-propane | 4-(3-chloro-phenyl)-1-[2-hydroxy-3-(4-methoxy-phenyl)-oxy-propyl]-piperazine. |
| 1-(4-isopropyl-phenyl)-piperazine | 1,2-oxido-3-(4-trifluoromethyl-phenyl)-oxy-propane | 1-[2-hydroxy-3-(4-trifluoromethyl-phenyl)-oxy-propyl]-4-(4-isopropyl-phenyl)-piperazine. |
| 1-(2-pyridyl)-piperazine | 1,2-oxido-3-phenyloxy-propane | 1-(2-hydroxy-3-phenyloxy-propyl)-4-(2-pyridyl)-piperazine. |
| 1-(2-methyl-phenyl)-1,4-diazacycloheptane | 1,2-oxido-3-phenyloxy-propane | 1-(2-hydroxy-3-phenyloxy-propyl)-4-(2-methyl-phenyl)-1,4-diazacycloheptane. |
| 1-(2-chloro-phenyl)-1,5-diazacyclooctane | 1,2-oxido-3-phenyloxy-propane | 5-(2-chloro-phenyl)-1-(2-hydroxy-3-phenyloxy-propyl)-1,5-diazacyclooctane. |
| 1-phenyl-piperazine | 1,2-oxido-3-phenyloxy-propane | 1-(2-hydroxy-3-phenyloxy-propyl)-4-phenyl-piperazine. |
| 1-phenyl-piperazine | 1,2-oxido-3-phenylmercapto-propane | 1-(2-hydroxy-3-phenylmercapto-propyl)-4-phenyl-piperazine. |
| 1-(2-chloro-phenyl)-piperazine | 1,2-oxido-3-phenylmercapto-propane | 4-(2-chloro-phenyl)-1-(2-hydroxy-3-phenylmercapto-propyl)-piperazine. |
| 1-(3-methyl-phenyl)-piperazine | 1,2-oxido-3-phenylmercapto-propane | 1-(2-hydroxy-3-phenylmercapto-propyl)-4-(3-methyl-phenyl)-piperazine. |
| 1-(2-methoxy-phenyl)-piperazine | 1,2-oxido-3-phenylmercapto-propane | 1-(2-hydroxy-3-phenylmercapto-propyl)-4-(2-methoxy-phenyl)-piperazine. |
| 1-(2-methyl-phenyl)-piperazine | 3-(4-chloro-phenyl)-mercapto-1,2-oxido-propane | 1-[3-(4-chloro-phenyl)-mercapto-2-hydroxy-propyl]-4-(2-methyl-phenyl)-piperazine. |

The above 1-(2-hydroxy-3-phenyloxy-propyl)-4-phenyl-piperazine, when reacted with acetic acid anhydride or diazoethane in the presence of fluoboric acid, yields the 1 - (2-acetyloxy-3-phenyloxy-propyl)-4-phenyl-piperazine and the 1-(2-ethoxy-3-phenyloxy-propyl)-4-phenyl-piperazine, respectively.

*Example 5*

To a solution of 10.6 g. of 1-(2-methyl-phenyl)-piperazine in 250 ml. of ethanol is added 6.4 g. of sodium carbonate; the reaction mixture is refluxed for four hours, cooled and treated with 11.2 g. of 2-hydroxy-3-phenyloxy-propyl chloride, and is then refluxed overnight. After cooling and filtering, the filtrate is evaporated under reduced pressure; the residue is treated with acetone; the crystalline 1 - (2 - hydroxy - 3 - phenyloxy - propyl)-4-(2-methyl-phenyl)-piperazine is filtered off, and converted into its dihydrochloride which melts at 170–171° after recrystallization from acetone.

The starting material used in the above procedure is prepared by treating a solution of the 1,2-oxido-3-phenyloxy-propane in anhydrous diethyl ether with gaseous hydrogen chloride while cooling.

*Example 6*

A mixture of 8.35 g. of N-(2-hydroxy-3-phenyloxy-propyl)-amine and 11.6 g. of N,N-di-(2-chloroethyl)-N-(2-methyl-phenyl)-amine in 50 ml. of methanol is refluxed in the presence of an excess of potassium carbonate for fifteen hours while stirring. The precipitate is filtered off, the filtrate is concentrated under reduced pressure, and the residue is taken up in acetone. The crystalline 1 - (2-hydroxy-3-phenyloxy-propyl)-4-(2-methyl-phenyl)-piperazine is filtered off, and converted into its dihydrochloride which melts at 170–171° after recrystallization from acetone.

The starting material used in the above procedure is prepared as follows: A mixture of 37.3 g. of 2-hydroxy-3-phenyloxy-propyl chloride and 44.0 g. of potassium phthalimide in 80 ml. of N,N-dimethylformamide is heated to reflux for two hours in the presence of a few crystals of potassium iodide as the catalyst. The hot solution is poured onto 200 g. of crushed ice, and the organic material is extracted with chloroform. The extract is washed with a 1 N aqueous solution of potassium hydroxide, 0.5 N aqueous hydrochloric acid and water, then dried over sodium sulfate and concentrated to dryness under reduced pressure. The residue is treated with 200 ml. of methanol containing 20 ml. of hydrazine hydrate (99–100%) and the mixture is refluxed for two hours. The solution is cooled, acidified with concentrated hydrochloric acid and again refluxed for thirty minutes. The reaction mixture is filtered, the filtrate is taken to dryness under reduced pressure, and the residue is dissolved in a minimum amount of water. The aqueous solution is made strongly alkaline with a 50 percent solution of potassium hydroxide, salted with potassium carbonate and extracted with diethyl ether. The organic extract is dried and concentrated under reduced pressure to yield the N-(2-hydroxy-3-phenyloxy-propyl)-amine, which is used in the subsequent step without further purification.

The N,N - di - (2 - chloroethyl) - N-(2-methyl-phenyl)-amine used in the above procedure is prepared by heating a mixture of o-toluidine and ethylene oxide in a sealed tube and converting in the resulting N,N-di-(2-hydroxyethyl)-N-(2-methyl-phenyl)-amine, the hydroxyl groups into chloro by treatment with thionyl chloride.

What is claimed is:
1. A member selected from the group consisting of a compound of the formula

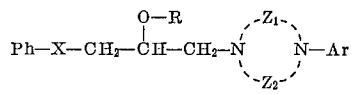

in which the group Ph is a member selected from the group consisting of phenyl, (lower alkyl)-phenyl, (lower alkoxy) - phenyl, (halogeno) - phenyl, and (trifluoromethyl)-phenyl, X is a member selected from the group consisting of oxygen and sulfur, R stands for a member selected from the group consisting of hydrogen, lower alkyl and lower alkanoyl, each of the groups $Z_1$ and $Z_2$ stands for alkylene having from two to seven carbon atoms and separating the two nitrogen atoms by from two to three carbon atoms, and Ar stands for a member selected from the group consisting of phenyl, (lower alkyl)-phenyl, (lower alkoxy)-phenyl, (halogeno)-phenyl, (trifluoromethyl)-phenyl, pyridyl, (lower alkyl)-pyridyl, furyl and thienyl, and acid addition salt thereof, an N-oxide thereof, an acid addition salt of an N-oxide thereof and a lower alkyl quaternary ammonium compound thereof.

2. A compound of the formula

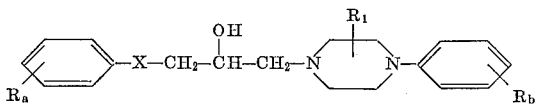

in which X stands for oxygen, the radical $R_1$ stands for hydrogen, the group $R_a$ stands for hydrogen, and the group $R_b$ is lower alkyl.

3. An acid addition salt of a compound of the formula

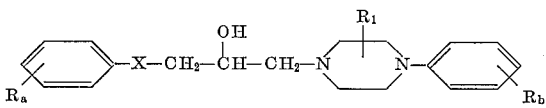

in which X is oxygen, the radical $R_1$ stands for hydrogen, the group $R_a$ stands for hydrogen, and the group $R_b$ is lower alkyl.

4. A compound of the formula

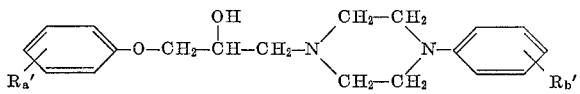

in which the group $R_a'$ is hydrogen, and the group $R_b'$ is halogeno.

5. An acid addition salt of a compound of the formula

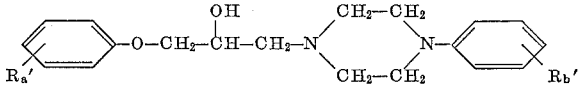

in which the group $R_a'$ is hydrogen, and the group $R_b'$ is halogeno.

6. 1 - (2 - hydroxy - 3-phenyloxy-propyl)-4-(2-methyl-phenyl)-piperazine.

7. An acid addition salt of 1-(2-hydroxy-3-phenyloxy-propyl)-4-(2-methyl-phenyl)-piperazine.

8. 4 - (2 - chloro - phenyl)-1-(2-hydroxy-3-phenyloxy-propyl)-piperazine.

9. An acid addition salt of 4 - (2-chloro-phenyl)-1-(2-hydroxy-3-phenyloxy-propyl)-piperazine.

10. 4 - (3 - chloro-phenyl)-1-(2-hydroxy-3-phenyloxy-propyl)-piperazine.

11. An acid addition salt of 4-(3-chloro-phenyl)-1-(2-hydroxy-3-phenyloxy-propyl)-piperazine.

References Cited by the Examiner

UNITED STATES PATENTS

| | | | |
|---|---|---|---|
| 2,575,122 | 11/51 | Pollard et al. | 260—268 |
| 2,899,436 | 8/59 | Morren | 260—268 |
| 3,133,925 | 5/64 | Cusic | 260—268 |
| 3,135,756 | 6/64 | Shapiro et al. | 260—268 |
| 3,147,260 | 9/64 | Ash et al. | 260—268 |
| 3,151,124 | 9/64 | Huebner | 260—268 |

NICHOLAS S. RIZZO, *Primary Examiner.*